Jan. 21, 1936. M. J. MITCHELL 2,028,344
SHIELD FOR TOOTHED SEPARATOR ELEMENTS
Filed Oct. 18, 1934
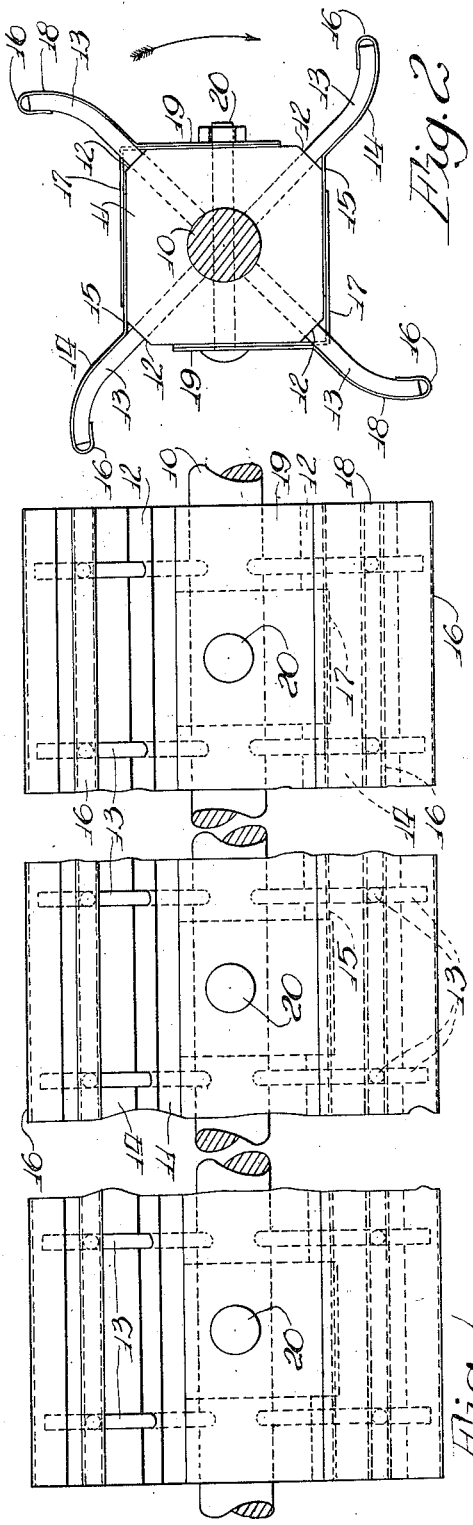
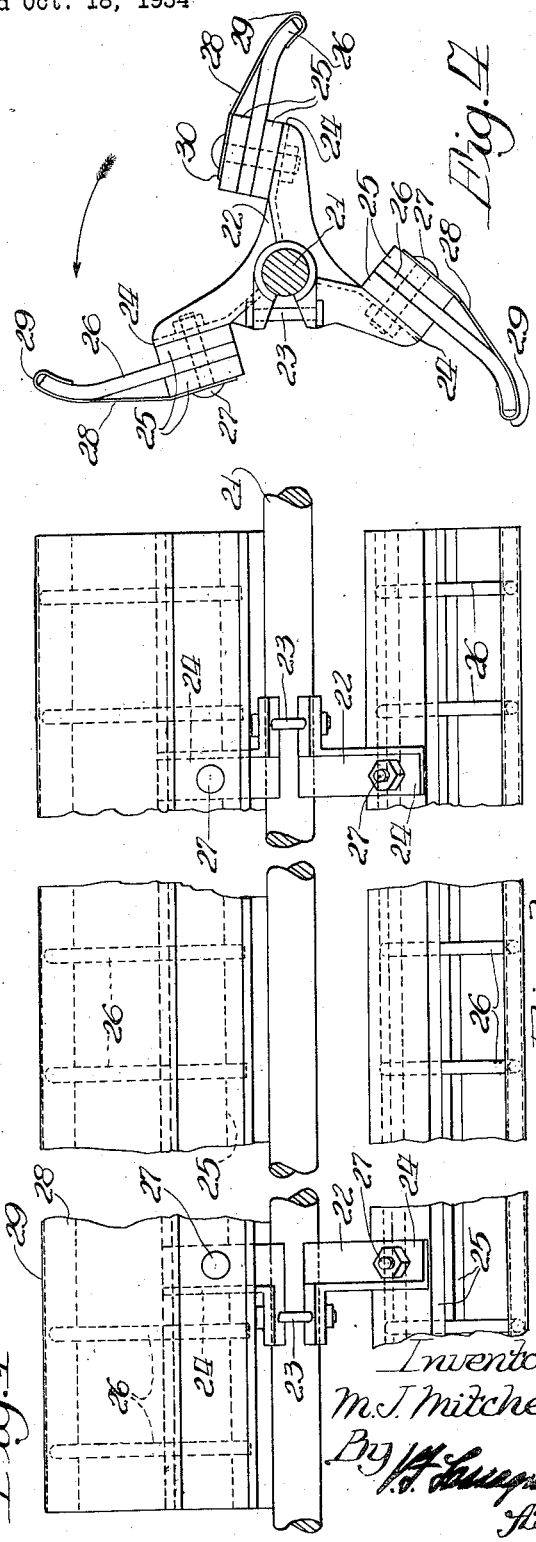

Patented Jan. 21, 1936

2,028,344

UNITED STATES PATENT OFFICE 2,028,344

SHIELD FOR TOOTHED SEPARATOR ELEMENTS

Melville J. Mitchell, Moline, Ill., assignor to International Harvester Company, a corporation of New Jersey Application October 18, 1934, Serial No. 748,811

7 Claims. (Cl. 130—23)

The invention relates to a shield or paddle attachment for spiked beaters and pickers used in separators.

Such spiked beaters and pickers are rotary drum elements employed in the separators of threshers, and harvester threshers, for assisting separation by beating and picking the grain and straw in its movement over the straw raddles or walkers. When the separator is operating in peas or other vine crops, it is found that the spikes of these rotary members become wound and wrapped with the vines to such an extent as to destroy their intended function.

Accordingly, the primary object of this invention is to provide a paddle or shield attachment for the rows of teeth on these rotary beater and picker elements to prevent fouling of the teeth.

Another object is to provide such attachments which are readily attachable and detachable, as desired.

Other important objects will become apparent to those skilled in this art as the disclosure is more fully made.

These beaters and pickers both are in the nature of a drum rotatable with a carrying shaft and provided with rows of spaced teeth for acting on the material in process of separation. Briefly, the improved attachment comprises shield members having a channeled edge adapted to be hooked over each row of the teeth, the opposite edge of the shield being suitably secured to the beater or picker securely to hold the shield in place.

In the drawing illustrating practicable examples of the invention:

Figure 1 is an elevational view of a picker drum showing the improved shields in place over its several rows of teeth;

Figure 2 is an end view of the structure shown in Figure 1;

Figure 3 is an elevational view of a beater showing a slightly modified form of shield attached to its respective rows of teeth; and Figure 4 is an end view of the structure shown in Figure 3.

The picker of Figures 1 and 2 is carried on a drive shaft 10 and comprises a drum member 11 which, in this example, is substantially square in cross section. Each corner edge of said block is chamfered off, as at 12, and drilled with spaced, radial holes to receive a row of spaced picker teeth 13, the ends of said teeth being uniformly curved back, as shown, away from the direction of rotation of the picker, as shown by the curved arrow.

The shields of Figures 1 and 2 are made of sheet metal and the two shields shown at 14 each include an extension 15. The opposite edge of the shield is curled into a channel form 16 adapted to hook over the teeth, as shown, while the extensions 15 lie flatly against opposite sides of the drum 11. Thereupon corner pieces 17 are laid over the corners and sides of the drum 11, as shown, with the pieces 17 located over and outside the two extensions 15 heretofore described. Next, shields 18 are similarly hooked over the diagonally opposite remaining two rows of teeth with their extensions 19 arranged outside of and against the adjacent portions of the corner pieces 17, as shown. Thus, the extensions 19 are oppositely disposed on the drum 11, which enables bolts 20 to be passed through said extensions 19, the corner pieces 17, the drum 11, and shaft 10, to secure said parts together. Obviously, by merely placing or removing the bolts 20, the shields 14, 18, and the corner pieces 17 may be quickly mounted or removed, as desired.

The beater structure shown in Figures 3 and 4 is quite similar to the structure above described, there being a carrying and driving shaft 21 and three armed, end spiders 22 clamped to the shaft 21, pinch-bind fashion, by means of bolts 23. The end of each radially disposed spider arm 22 includes a shoulder 24, against which is placed a pair of spaced bars 25, between which the beater teeth 26 are located in suitable spaced relationship. A bolt 27 serves securely to clamp these bars 25 with the teeth 26 therebetween to the shoulder 24 described.

When it is desired to employ this beater structure in separating peas, or other vine crops, a shield 28 having a curled edge 29 is hooked over each row of teeth 26 in the manner shown in Figure 4. This shield is preferably made of sheet metal and has an angularly disposed extension 30 adapted to be placed flatly against the outer one of the bars 25, so that the bolt 27 may be utilized in holding said shield 28 attached to and with the bars 25 to the shoulder 24 in an obvious manner. With the shield 28 thus in place over the teeth 26, the vines cannot wind about the teeth or drum structure to foul the same and prevent its proper functioning. The direction of rotation of this beater of Figure 4 in use is indicated by the curved arrow in said figure.

From this disclosure it can now be appreciated that for either a spiked rotary picker or a spiked rotary beater, a simple shield structure has been provided which can easily be placed over the spikes and anchored to the drum structures, or removed therefrom, as desired, with a minimum of effort.

It is the intention to cover all such changes and modifications of the examples herein shown and described as do not in material respects constitute departures from the spirit and scope of the invention covered by the appended claims.

What is claimed is:

1. An attachment for a rotary separator element comprising a drum structure having a row of spaced teeth anchored thereto, said attachment comprising a shield having one edge formed to hook detachably over said teeth, and having an opposite edge adapted to be clamped detachably to said drum structure.

2. An attachment for a rotary separator element comprising a drum structure having a row of spaced teeth anchored thereto, said teeth having curved bent ends, said attachment comprising a shield having a curled edge adapted to be detachably hooked over the teeth and curved to conform thereto, said shield also having an extension adapted to be anchored to said drum structure.

3. An attachment for a rotary separator element comprising a drum structure having a row of spaced teeth secured thereto, said attachment comprising a shield conforming to the shape of the teeth so as to lay flatly thereagainst and having a channeled edge portion to be hooked over the ends of said teeth, said shield including an extension, and means adapted for detachably securing the extension to the drum structure to secure the shield in place.

4. An attachment for a rotary separator element comprising a drum structure having a row of spaced teeth secured thereto, said attachment comprising a shield conforming to the shape of the teeth so as to lay flatly thereagainst and having a channeled edge portion to be hooked over the ends of said teeth, said shield having an extension to lie flatly against a portion of the drum structure, and bolts adapted to be passed through the extension into the drum structure to secure the shield in place.

5. An attachment for a rotary separator element comprising a flat sided drum structure having a row of spaced teeth extending from a corner edge thereof, said attachment comprising a shield shaped to fit over the ends of said teeth and adapted to lie thereagainst and having an angularly disposed extension adapted to lie flatly against a side of the drum structure, and means adapted for securing said extension to the drum structure.

6. An attachment for a rotary separator element comprising a shaft carrying spider arms formed with a shoulder, clamp bars with a row of spaced teeth held therebetween and secured to said shoulder, said attachment therefor comprising a shield shaped to fit over the ends of said teeth and adapted to lie thereagainst, said shield having an extension adapted to lie against one of the clamp bars and to be fastened thereto to hold the shield attached to said teeth.

7. A rotary separator element having a row of spaced teeth thereon, a shield attachment for the teeth having a curled edge adapted to hook over the ends of said teeth, and an extension included in the shield adapted to be secured to the element.

MELVILLE J. MITCHELL.